United States Patent
Mäenpää et al.

(10) Patent No.: US 7,539,164 B2
(45) Date of Patent: May 26, 2009

(54) METHOD AND SYSTEM FOR LOCAL MOBILITY MANAGEMENT

(75) Inventors: Sanna Mäenpää, Espoo (FI); Seppo Vesterinen, Oulunsalo (FI)

(73) Assignee: Nokia Corporation, Espoo (FI)

( * ) Notice: Subject to any disclaimer, the term of this patent is extended or adjusted under 35 U.S.C. 154(b) by 571 days.

(21) Appl. No.: 10/989,512

(22) Filed: Nov. 17, 2004

(65) Prior Publication Data

US 2005/0088994 A1 Apr. 28, 2005

Related U.S. Application Data

(63) Continuation of application No. PCT/FI03/00389, filed on May 20, 2003.

(30) Foreign Application Priority Data

Jun. 14, 2002 (FI) .................................. 20021164

(51) Int. Cl.
*H04W 4/00* (2009.01)
(52) U.S. Cl. .................. 370/331; 370/338; 455/436
(58) Field of Classification Search .............. 370/331, 370/352, 338; 709/239, 238, 202, 250; 455/436
See application file for complete search history.

(56) References Cited

U.S. PATENT DOCUMENTS

| | | | | |
|---|---|---|---|---|
| 6,466,964 B1* | 10/2002 | Leung et al. | ................. | 709/202 |
| 6,839,337 B2* | 1/2005 | Newberg et al. | ........... | 370/338 |
| 6,947,401 B2* | 9/2005 | El-Malki et al. | ........... | 370/331 |
| 6,982,967 B1* | 1/2006 | Leung | ........................ | 370/328 |
| 6,992,994 B2* | 1/2006 | Das et al. | .................... | 370/328 |
| 7,028,099 B2* | 4/2006 | Troxel et al. | ................ | 709/239 |
| 7,283,496 B2* | 10/2007 | Gurivireddy et al. | ........ | 370/331 |
| 7,290,064 B2* | 10/2007 | Patel et al. | .................. | 709/250 |
| 7,349,377 B2* | 3/2008 | Le et al. | ..................... | 370/338 |
| 7,380,124 B1* | 5/2008 | Mizell et al. | ................ | 713/171 |

(Continued)

FOREIGN PATENT DOCUMENTS

EP 0 851 633 A2 7/1998

(Continued)

OTHER PUBLICATIONS

Malinen J., Perkins Charles (Nokia Research Center): Title: Mobile IPv6 Regional Registrations draft- Malinen—Mobile IP- Regreg6-00.txt: Date: Jul. 14, 2000: pp. 1 to 18.*

(Continued)

*Primary Examiner*—Wing F Chan
*Assistant Examiner*—Robert C Scheibel
(74) *Attorney, Agent, or Firm*—Squire, Sanders & Dempsey, LLP

(57) ABSTRACT

The present invention describes a method and system for local mobility management in which the mobility management taking place inside the mobile agent (MA) domain is hidden from the home agent (HA) and correspondent node (CN). In the method the mobile agent (MA) prefix information is broadcast over the air interface. An access router is implemented in the cellular access node (CAN). The cellular access node (CAN) also comprises a cellular access point (CAP). Proxy functionality is arranged to the cellular access point (CAP). Binding entries are created to the mobile agent (MA) so that only basic mobile IPv6 needs to be supported in the mobile node (MN).

20 Claims, 5 Drawing Sheets

U.S. PATENT DOCUMENTS

| | | |
|---|---|---|
| 2002/0021680 A1* | 2/2002 | Chen .......................... 370/331 |
| 2002/0026527 A1 | 2/2002 | Das et al. |
| 2002/0066036 A1* | 5/2002 | Makineni et al. ............ 713/201 |
| 2002/0085719 A1* | 7/2002 | Crosbie ...................... 380/248 |
| 2003/0018810 A1* | 1/2003 | Karagiannis et al. ........ 709/238 |
| 2003/0104814 A1* | 6/2003 | Gwon et al. ................. 455/436 |
| 2004/0066777 A1* | 4/2004 | Vesterinen et al. .......... 370/352 |
| 2004/0105420 A1* | 6/2004 | Takeda et al. ............... 370/349 |
| 2005/0088994 A1* | 4/2005 | Maenpaa et al. ............ 370/331 |

FOREIGN PATENT DOCUMENTS

| | | |
|---|---|---|
| EP | 1 009 134 | 6/2000 |
| EP | 1 009 141 | 6/2000 |
| EP | 1 124 396 | 8/2001 |
| EP | 1 128 632 | 8/2001 |
| WO | WO 99/31846 | 6/1999 |
| WO | WO 01/31472 | 5/2001 |
| WO | WO 02/065731 | 8/2002 |

OTHER PUBLICATIONS

Malinen, et al; "Mobile IPv6 Regional Registrations draft-malinen-mobileip-regreg6-00.txt"; Jul. 14, 2000, IETF, pp. 1-18.*

Thomson et al, "IPv6 Stateless Address Autoconfiguration"; Dec. 1998; IETF; RFC 2462; pp. 1-25.*

Um et al, "A Study on path re-routing algorithms at the MPLS-based hierarchical mobile IP network," In: Proceedings of IEEE Region 10 International Conference on Electrical and Electronic Technology, 2001, TENCON, Singapore Aug. 19-22, 2001, vol. 2, pp. 691-697.

Chen et al, "Solving location problem of a mobile host by an agent group", Seventh IEEE International Symposium on Personal, Indoor and Mobile Radio Communications, 1996. PIMRC 96; Taipei, Taiwan, Oct. 15-18, 1996, vol. 2, pp. 708-712.

* cited by examiner

Bu formed by MN

| Src | Dest | |
|---|---|---|
| PCoA | HA | Payload |

40

BU formed by proxy function in CAP

| Src | Dest | Src | Dest | |
|---|---|---|---|---|
| AR@ | MA@ | PCoA | HA | Payload |

41

Bu formed by MA

| Src | Dest | |
|---|---|---|
| PCoA | HA | Payload |

42

Packet sent by correspondent node

Packet modified in the Mobile Agent

Packet modified by CAP

Packet sent to the correspondent node

METHOD AND SYSTEM FOR LOCAL MOBILITY MANAGEMENT

This is a Continuation of International Application No. PCT/FI03/00389 filed May 20, 2003, which designated the U.S. and was published under PCT Article 21(2) in English.

FIELD OF THE INVENTION

The present invention relates to data communications. Particularly the present invention relates to the optimization of the performance of the Internet Protocol (IP) localized mobility concepts.

BACKGROUND TO THE INVENTION

As the trend goes towards mobile internet, the complete internet protocol must be adopted in the mobile networks. A mobile terminal is assigned a unique IP-address so that data packets can be sent to the right terminal. The internet protocol has been used for a long time in fixed networks. There has not been need for mobility functionality until recently due to the new mobile devices with the possibility for packet switched data communications.

To provide the new functionality required by the mobility, a mobile internet protocol was introduced. The mobile internet protocol allocates two associated addresses for a mobile terminal: home address which enables the mobile terminal to be reachable with the same address regardless of its point of attachment and a care of address which enables to route the packets to the current point of attachment of the mobile terminal. This means that routing devices and transceiver stations of a mobile network must know and control the location of the mobile terminal and be able to efficiently route packets to the right terminal. At the moment, the IPv4 addressing scheme is in use but it will be replaced by the IPv6 in the future.

Within a radio access network (RAN) mobile terminals can move rapidly from one base station to another. A handover may occur when mobile stations move within a mobile network. When a mobile terminal moves from one base station to another, the routing must be changed. In the handover procedure, packets destined to the mobile terminals are directed to a base station. When the actual handover occurs packets will be directed to a new base station. This change must be fast to allow the data communication service continue at the selected quality of service. The handover can occur between similar network cells, for example from a GSM (Global System for Mobile communications) cell to another GSM cell, or between different type of networks, for example from a GSM network to a UMTS (Universal Mobile Telecommunications System) network.

New routing rules must be carried out within a mobile network for handover procedures. In routed networks, the routing rules are stored in routing tables. To change the routing table a routing table update message must be sent to all routers that the change effects to. The publication WO 0199458 introduces an efficient method for performing a mobile user terminal route update in a telecommunications network based on the internet protocol. The publication WO 0199458 teaches a method for updating the routing procedures. The method works in circuit and packet switched networks. In the method, a second base station sends new routing information to a routing element. The mobile device does not need to initiate the change of the routing tables. A benefit of the publication is that the router learns the new route early enough so that no data is lost in the handover procedure. The publication teaches the basic principles of the proxy localized management concept, in which the IP level local mobility management operations are hidden from the actual mobile device.

The drawbacks of prior-art solutions are that the modifications are needed to the terminal side and the signalling over the air interface. Required changes to already existing terminals are hard to implement. In cases where the changes cannot be implemented by software only, the customer needs to update his/her terminal.

PURPOSE OF THE INVENTION

The present invention teaches a method e.g. for the MIPv6 (Mobile Internet Protocol, version 6) in a manner that localization mobility management extensions are not needed. Furthermore, the purpose of the present invention is to describe how IPv6 handover methods currently under definition in the IETF (Internet Engineering Task Force) can be utilized in these concepts. The same method can be applied also with MIPv4 ((Mobile Internet Protocol, version 4) with slight modifications.

SUMMARY OF THE INVENTION

The present invention describes a method and system in which proxy local mobility management functions are utilized e.g. with the MIPv6. The invention neither requires any changes to the mobile nodes using the MIPv6 nor any extension for local mobility management. Furthermore, the present invention describes a method in which IPv6 handover methods can be utilized in the concepts without changes in the standards or definitions set by the IETF.

In the present invention, layer 3 mobile agent information is broadcast over the air interface instead of the access router prefix information. In order to know when a mobile node is away from home, it must get a temporary address which is called as a care of address (CoA). According to the present invention, a mobile node generates a CoA based on the mobile agent's prefix and mobile node's layer 2 address or some other locally unique identifier.

The generated CoA is used when the mobile node sends a binding update message towards the home agent or correspondent node. Thus, the mobile node needs to support only basic MIPv6 and it does not have to be aware of the local mobility management taking place between the mobile agent and cellular access node. The local mobility management utilized in the present invention is based e.g. on mobile IPv6 regional registration protocol (MIPv6RR), hierarchical mobile IPv6 (HMIPv6) or basic mobile IPv6.

The present invention has various benefits. Compared to other local mobility management solutions, the proxy mechanism reduces the MIPv6+ extension signalling over the radio interface, which is important for capacity limited cellular radio interfaces. The present invention takes an advantage of the MIPv6 regional forwarding that avoids an extra 40-byte overhead due to tunnelling. The proxy care of address (PcoA) assigned during initial registration with the mobile agent can be kept unchanged until the MA handover occurs. This reduces signalling over the air interface because the update binding has to be sent to the mobile node only when it moves from a mobile agent to another. The present invention does not require layer 3 signalling at all over the air during handovers because layer 3 mobility activities are hidden from the mobile node, and a proxy function in the cellular access point (CAP) takes care of the required MIPv6 signalling. The route switching happens in the mobile agent so there is no need for routing via an access router. Because the layer 2 is aware of the layer 3 issues, a proper synchronization can be implemented between layer 2 and 3 handovers. Layer 3 context transfer can be triggered optionally from the target CAP at an optimal point of the handover scenario.

DETAILED DESCRIPTION OF THE INVENTION

Figure 1:
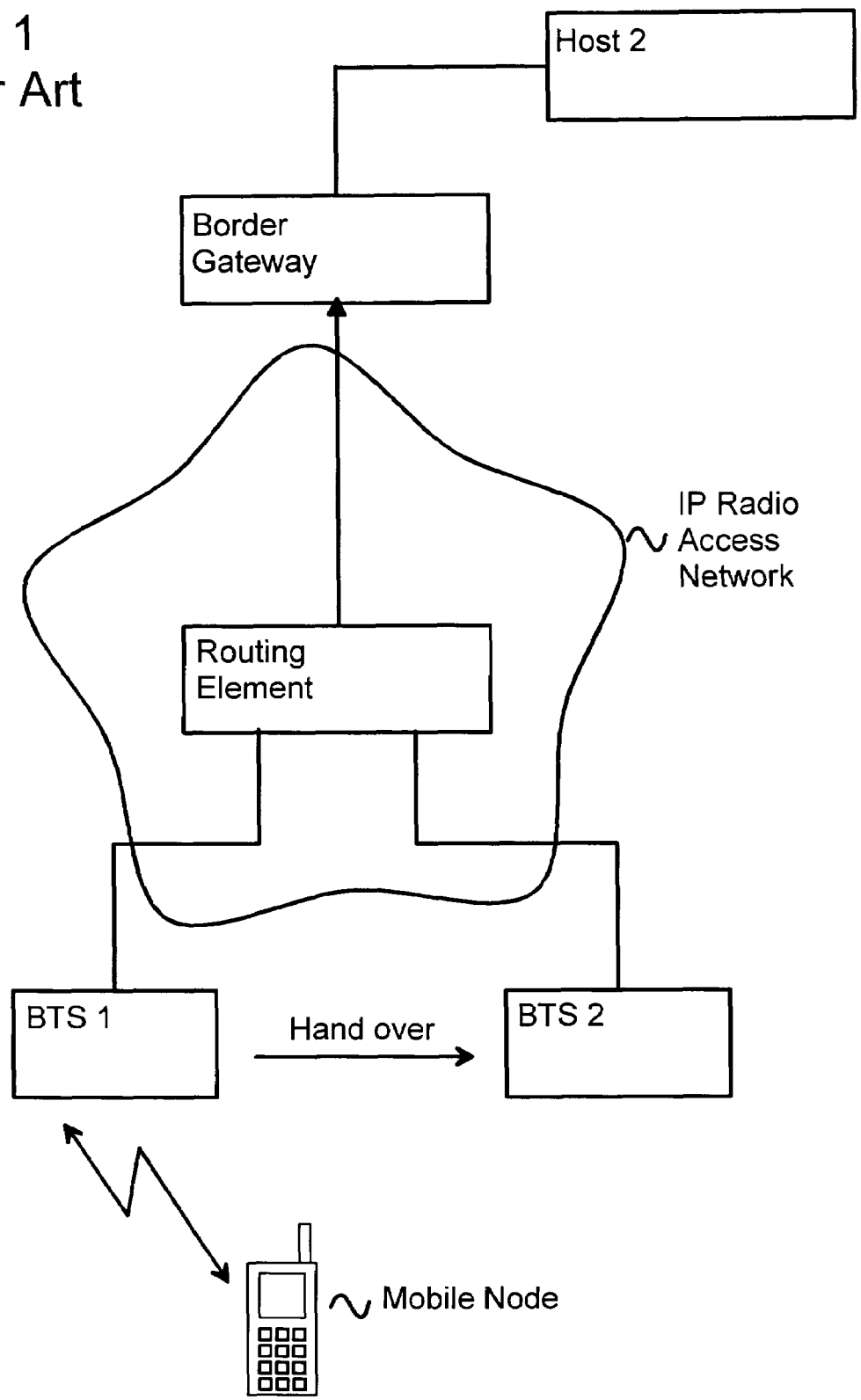
FIG. 1 illustrates a prior-art solution in which an access router is used.
Figure 2:
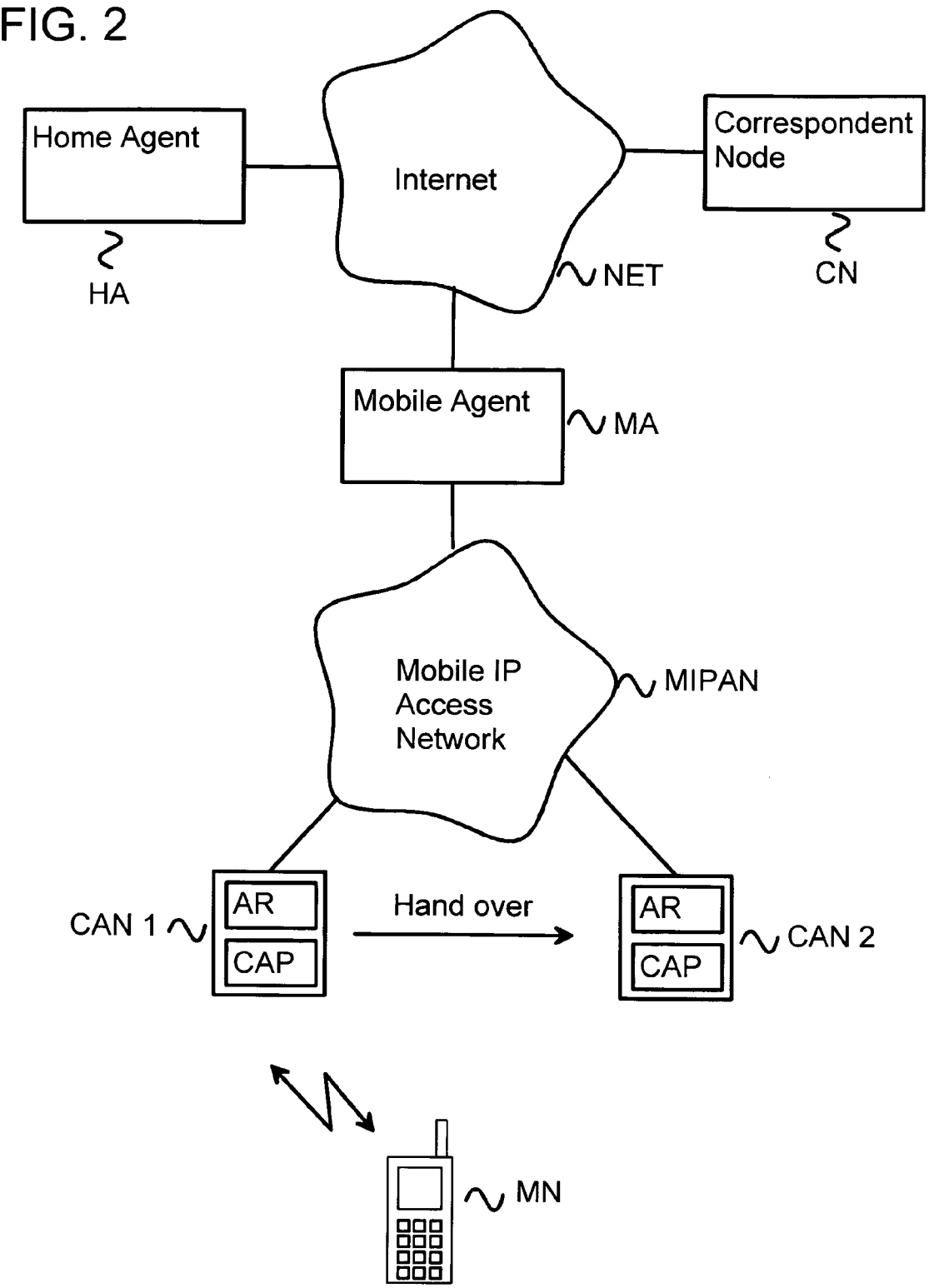
FIG. 2 illustrates a system in accordance with the invention.

FIG. 2 represents a system in accordance with the present invention. In the system, a mobile node MN is connected to a cellular access node CAN. There are two nodes, CAN 1 and CAN 2, but the amount of nodes can vary. Cellular access nodes CAN are connected to the mobile IP access network MIPAN that is connected to the mobile agent MA. More accurately, the mobile IP access network MIPAN forms the Local Mobility Domain that is under management of the mobile agent MA. The mobile agent MA is connected to the home agent HA and correspondent node CN via the Internet NET. The cellular access node CAN consists of an access router AR and a cellular access point CAP. Proxy functions are implemented in the cellular access point CAP. The system of FIG. 2 has the advantages over the prior-art solutions that it does not need any separate routing element. In the present invention, layer 3 MA prefix information is broadcast over the air interface instead of access router AR prefix information. The mobile node MN generates a care of address (CoA) based on the mobile agent MA prefix and mobile node layer 2 address. Instead of the layer 2 address some other locally unique identifier may be used. CoA is then used when the mobile node MN sends binding updates towards the home agent HA or correspondent node CN. Thus, the mobile node MN needs to support only basic MIPv6 and it does not has to be aware of the local mobility management taking place between the cellular access node CAN and mobile agent MA.

Figures 3, 4:
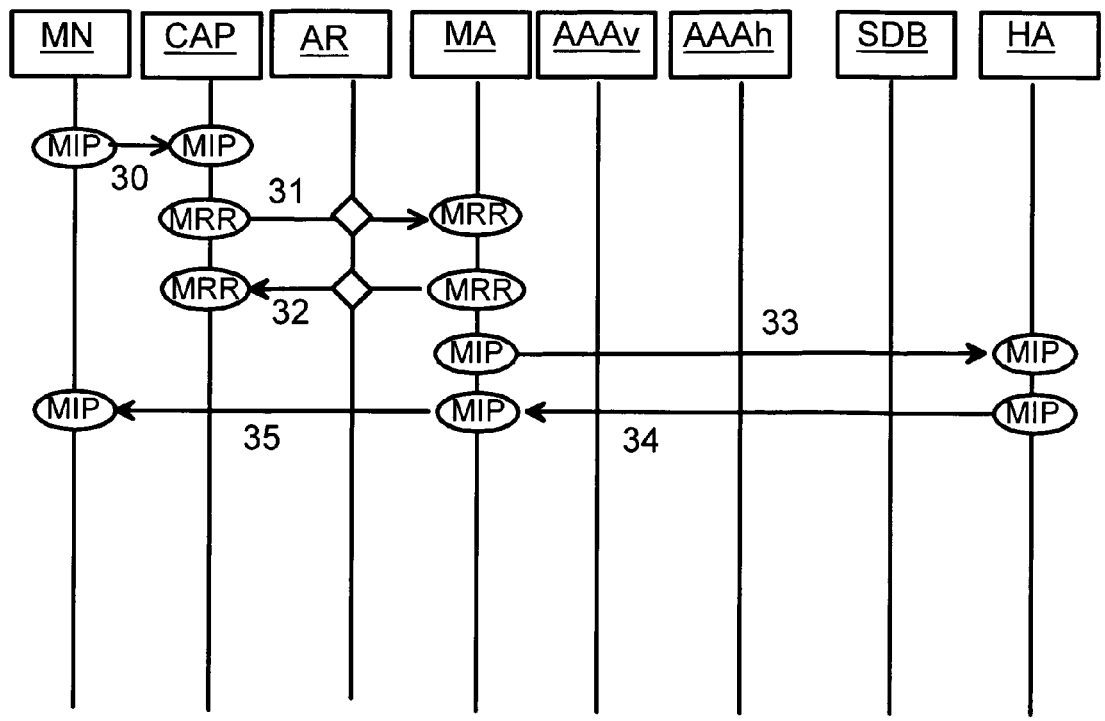
FIG. 3 illustrates the signalling of the initial registration with the proxy model.
FIG. 4 illustrates binding update packets used in the initial registration.

FIG. 3 illustrates the signalling in the MIPv6 initial registration and binding entry creation in the mobile agent MA. The mobile node MN initiates the signalling by sending a binding update (BU) message to the cellular access point CAP, step 30. MIP in FIG. 3 refers to mobile ip. The CAP encapsulates the message and changes the source address of the packet to AR@ (access router address). The CAP sends a proxy binding update to the mobile agent MA, step 31. MRR in FIG. 3 refers to mobile ip regional registration. The mobile agent MA creates a binding entry including the proxy care of address (PcoA) based on the mobile agent MA prefix and mobile node's layer 2 address associated with AR@. The mobile agent responds to the CAP with a BU acknowledgement message, step 32. The mobile agent MA sends the changed binding information to the home agent HA, step 33. The home agent HA responds with the acknowledgement message, step 34. The mobile agent MA sends an acknowledgement message to the mobile node, step 35. Every time the access router AR changes, the mobile agent's PCoA is associated with the new AR@.

FIG. 4 illustrates binding update packet structures. Packet 40 is used in sending the initial packet for binding update. Packet 40 is formed in a mobile node. In the packet 40, the source address is PCoA and the destination is the address of the home agent. Packet 41 is formed by encapsulating the packet 40. In the encapsulation process AR@ is set to the source address and the mobile agent's address MA@ is set to the destination address. The packet 42 formed by the mobile agent is similar to the packet 40. The content and length of the fields are not fixed but can be chosen according to application needs.

Figure 5:
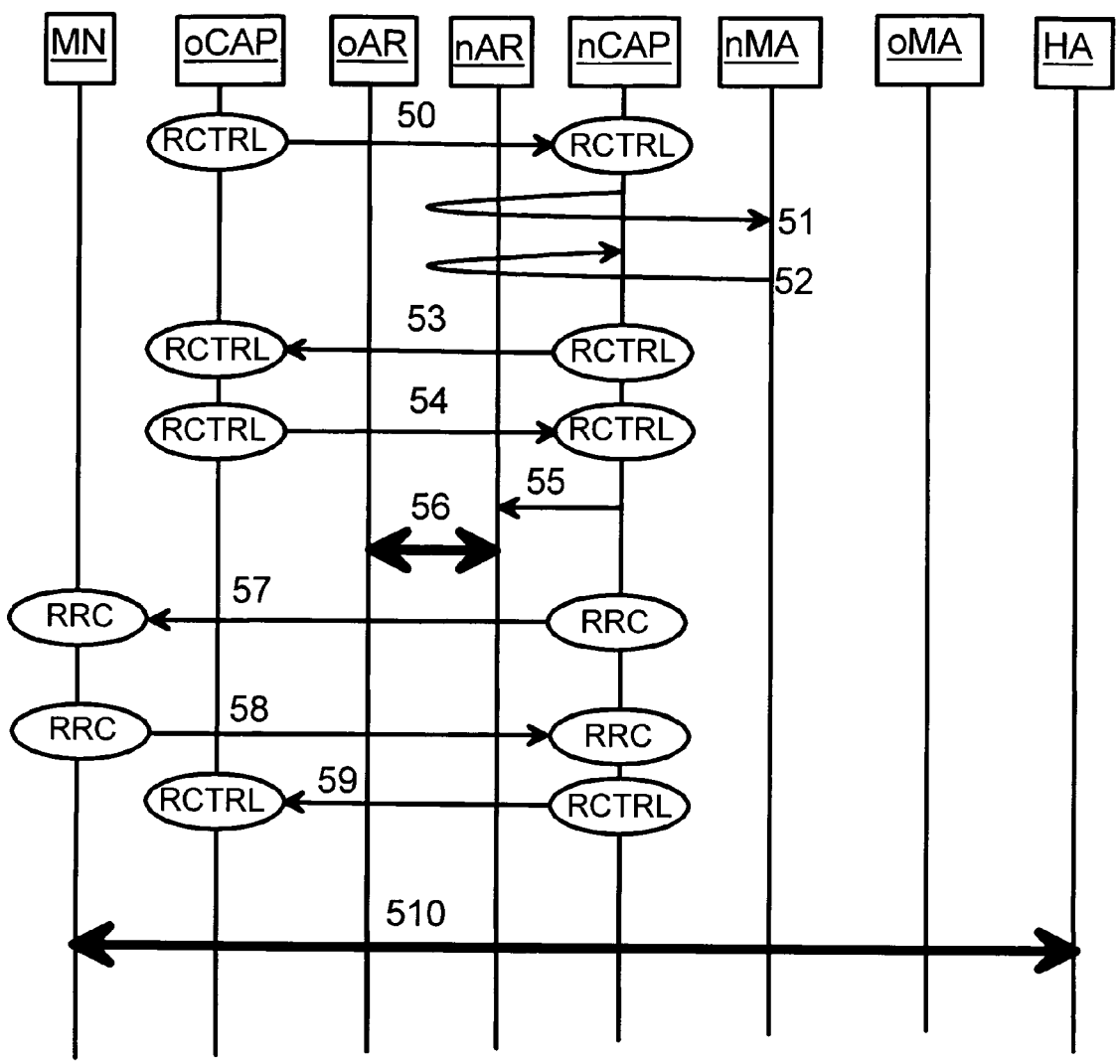
FIG. 5 illustrates the signalling of the network initiated inter mobile agent relocation.
Figure 6:
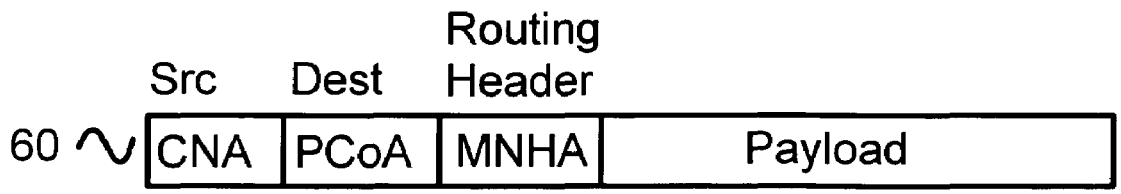
FIG. 6 illustrates binding update packets used in the network initiated inter mobile agent relocation.
Figure 6:
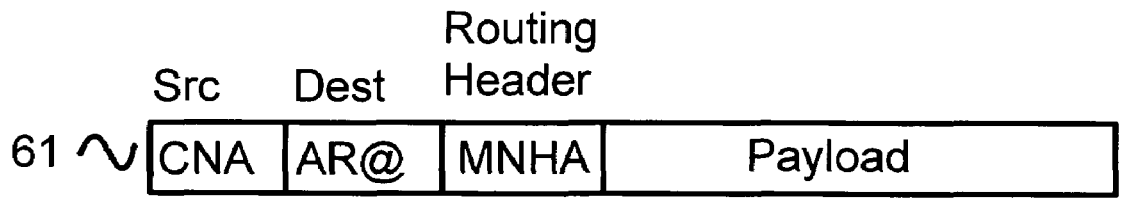
Figure 6:
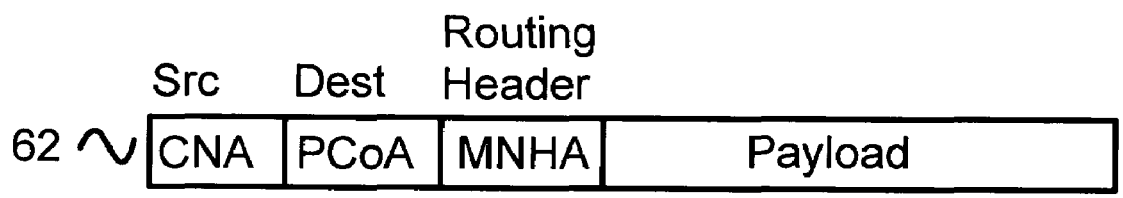
Figure 6:

FIG. 5 illustrates signalling flow in inter mobile agent relocation. In this example the serving CAP relocation is described according to WCDMA (Wideband Code Division Multiple Access) soft handover case. A relocation request is sent from the old cellular access point oCAP to the new cellular access point nCAP, step 50. RCTRL in FIG. 5 refers to radio access control protocol between cellular access points. The nCAP sends a proxy binding update packet to the new mobile agent nMA via the new access router nAR, step 51. New mobile agent nMA responds with an acknowledgement message, step 52. After receiving the acknowledgement message, the nCAP sends a relocation response to the oCAP, step 53. The oCAP sends relocation information to the nCAP, step 54. Then, the nCAP sends layer 3 context trigger to the new access router nAR, step 55. The new access router nAR and old access router oAR start the layer 3 context transfer, step 56. Universal Terrestrial Radio Network (UTRAN) mobility information is sent to the mobile node MN, step 57 (WCDMA soft handover). RRC in FIG. 5 refers to the radio resource control protocol. The mobile node MN responds by sending a confirmation message to the new CAP, step 58. A relocation complete message is sent to old CAP, step 59. The procedure is then continued with binding entry creation, step 510. The binding entry creation signalling is illustrated in FIG. 3. FIG. 6 illustrates packets used in mobile IPv6 regional forwarding. The original regional forwarding is specified in the IETF draft "mobile Ipv6 Regional Forwarding", March 2001. The original regional forwarding is slightly modified because the proxy function is located in the cellular access point CAP. The proxy care of address (PcoA) is based on a mobile agent's prefix and mobile node's layer 2 address associated with AR@. AR@ is based on access router prefix and mobile node's layer 2 address. The forwarding of packets from correspondent node to the mobile node is initiated by sending the packet 60. In the packet, the source is the correspondent node's address CNA, the destination field is PCoA and the mobile node's home address is used as a routing header MNHA. The mobile agent modifies the packet 60 by setting AR@ to the destination field. When the mobile agent has an entry in the regional binding cache for the home address in the routing header MNHA, the modified packet 61 is forwarded to the access router AR that forwards it further to the link where the cellular access point CAP is connected. The packet 61 is modified in a cellular access point that comprises binding information between AR@ and PCoA. In the packet 62, the destination field is set to PCoA. The mobile node sends packet 63 to the correspondent node using PCoA as the source address exactly as with the basic mobile IPv6.

In the regional route updates in handovers, the invention applies an already known method for performing a mobile user terminal route update in a telecommunication network operated based on the Internet Protocol. Radio access specific mobility functions are synchronized with the Mobile IPv6 functions in the cellular access points that are involved in the handover. The proxy function in the cellular access point sends the route update message to the mobile agent. The route update message is named in this invention as a proxy binding update. The mobile agent replies to the cellular access point with an acknowledgement message.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A method, comprising:
   registering binding updates when a mobile node changes location in a mobile internet protocol access network; and
   performing an internet protocol local mobility management operation where a proxy function is not visible to the mobile node by having a proxy function in a cellular access point encapsulate a binding update message from the mobile node, and being responsible for protocol signalling, and by using a care of address generated based on a prefix of a mobile agent prefix and a locally unique identifier of the mobile node in a binding update message, said encapsulation of said binding update message comprising changing at least one of the source address of the message to an access router address and the destination address of the message to a mobile agent's address, and
   wherein the mobile node mobility inside a local mobility domain is hidden from a home agent and a correspondent node both of said home agent and said correspondent node being separate from the cellular access point and being connected to the internet.

2. The method according to claim 1, wherein the network is a packet switched network.

3. The method according to claim 1, wherein the network is an internet protocol version-6 network.

4. The method according to claim 1, wherein the network is an internet protocol version-4 network.

5. The method according to claim 1, wherein the network is a cellular communications network.

6. The method according to claim 1, further comprising:
   broadcasting a layer-3 mobile agent prefix over an air interface of the network.

7. The method according to claim 1, wherein the locally unique identifier is the mobile node's layer-2 address.

8. The method according to claim 1, wherein the mobile agent creates the binding entry comprising a proxy care of address based on a prefix of a mobile agent and the mobile node's layer-2 address associated with an access router address.

9. The method according to claim 8, wherein the binding is updated whenever the access router changes.

10. A system, comprising:
    a home agent connected to the internet;
    a mobile agent connected to the internet;
    a mobile internet protocol access network comprising one or more local internet protocol mobility domains;
    a correspondent node connected to the internet;
    one or more cellular access nodes connected to the mobile internet protocol access network; and
    one or more mobile nodes connected to the cellular access nodes,
    wherein the cellular access node further comprises a cellular access point comprising a proxy function which performs encapsulating a binding update message from the mobile node and being responsible for protocol signalling, said encapsulation of said binding update message comprising changing at least one of the source address of the message to an access router address and the destination address of the message to the mobile agent's address, and
    wherein a mobile node is configured to generate a care of address based on a prefix of the mobile agent and a locally unique identifier of the mobile node, and to use the care of address in a binding update message, and said home agent, said mobile agent and said correspondent node are separate from the cellular access point.

11. The system according to claim 10, wherein the mobile agent is configured to create a binding entry including a proxy care of address based on the prefix of the mobile agent and mobile node's layer-2 address associated with an access router address.

12. The system according to claim 10, wherein the network is a packet switched network.

13. The system according to claim 10, wherein the network is an internet protocol version-6 network.

14. The system according to claim 10, wherein the network is an internet protocol version-4 network.

15. The system according to claim 10, wherein the network is a cellular communications network.

16. A method, comprising:
    receiving a proxy binding update message;
    creating a binding entry including a proxy related address based on a mobile agent prefix and a mobile node related address by having a proxy function in a cellular access point encapsulate a binding update message from the mobile node, and being responsible for protocol signalling, and by using a care of address generated based on a prefix of the mobile agent prefix and a locally unique identifier of the mobile node in a binding update message, said encapsulation of said binding update message comprising changing at least one of the source address of the message to an access router address and the destination address of the message to a mobile agent's address;
    transmitting an acknowledgement message to the source of the binding update message, and transmitting a changed binding entry information to a home agent, and
    wherein said home agent is separate from the cellular access point;
    receiving an acknowledgment message from the home agent; and
    repeating one or more of the above operations when the mobile agent prefix changes.

17. An apparatus, comprising:
    a receiver configured to receive a proxy binding update message;
    an entry creator configured to create a binding entry including a proxy related address based on a mobile agent prefix and a mobile node related address by having a proxy function in a cellular access point encapsulate a binding update message from the mobile node, and being responsible for protocol signalling, and by using a care of address generated based on a prefix of the mobile agent prefix and a locally unique identifier of the mobile node in a binding update message, said encapsulation of said binding update message comprising changing at least one of the source address of the message to an access router address and the destination address of the message to a mobile agent's address;
    a transmitter configured to transmit an acknowledgement message to the source of the binding update message, and transmitting a changed binding entry information to a home agent, and wherein said home agent is separate from the cellular access point; and an acknowledgment receiver configured to receive an acknowledgment message from the home agent.

18. An apparatus, comprising:

receiving means for receiving a proxy binding update message;

creating means for creating a binding entry including a proxy related address based on a mobile agent prefix and a mobile node related address by having a proxy function in a cellular access point encapsulate a binding update message from the mobile node, and being responsible for protocol signalling, and by using a care of address generated based on a prefix of the mobile agent prefix and a locally unique identifier oaf the mobile node in a binding update message, said encapsulation of said binding update message comprising changing at least one of the source address of the message to an access router address and the destination address of the message to a mobile agent's address;

transmitting means for transmitting an acknowledgement message to the source of the binding update message, and transmitting a changed binding entry information to a home agent, and wherein said home agent is separate from the cellular access point;

receiving means for receiving an acknowledgment message from the home agent; and repeating means for repeating one or more of the above operations when the mobile agent prefix changes.

19. The system according to claim 10, wherein the mobile agent is configured to update the binding whenever the access router changes.

20. The system according to claim 10, wherein the locally unique identifier is the mobile agent's layer-2 address.

* * * * *